April 23, 1929.  E. A. WHITE  1,710,199
SIZING MACHINE
Filed May 18, 1927  3 Sheets-Sheet 1
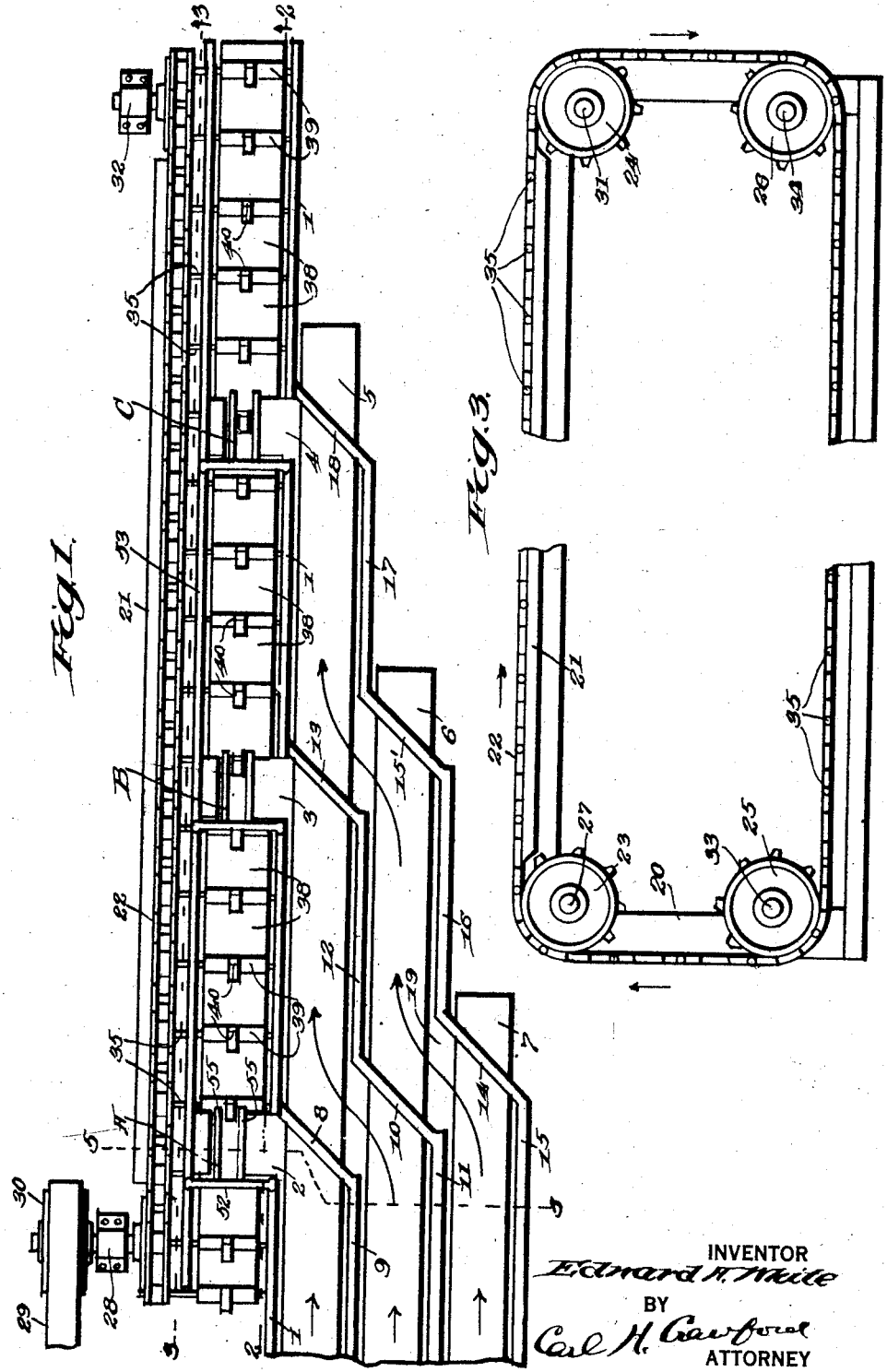

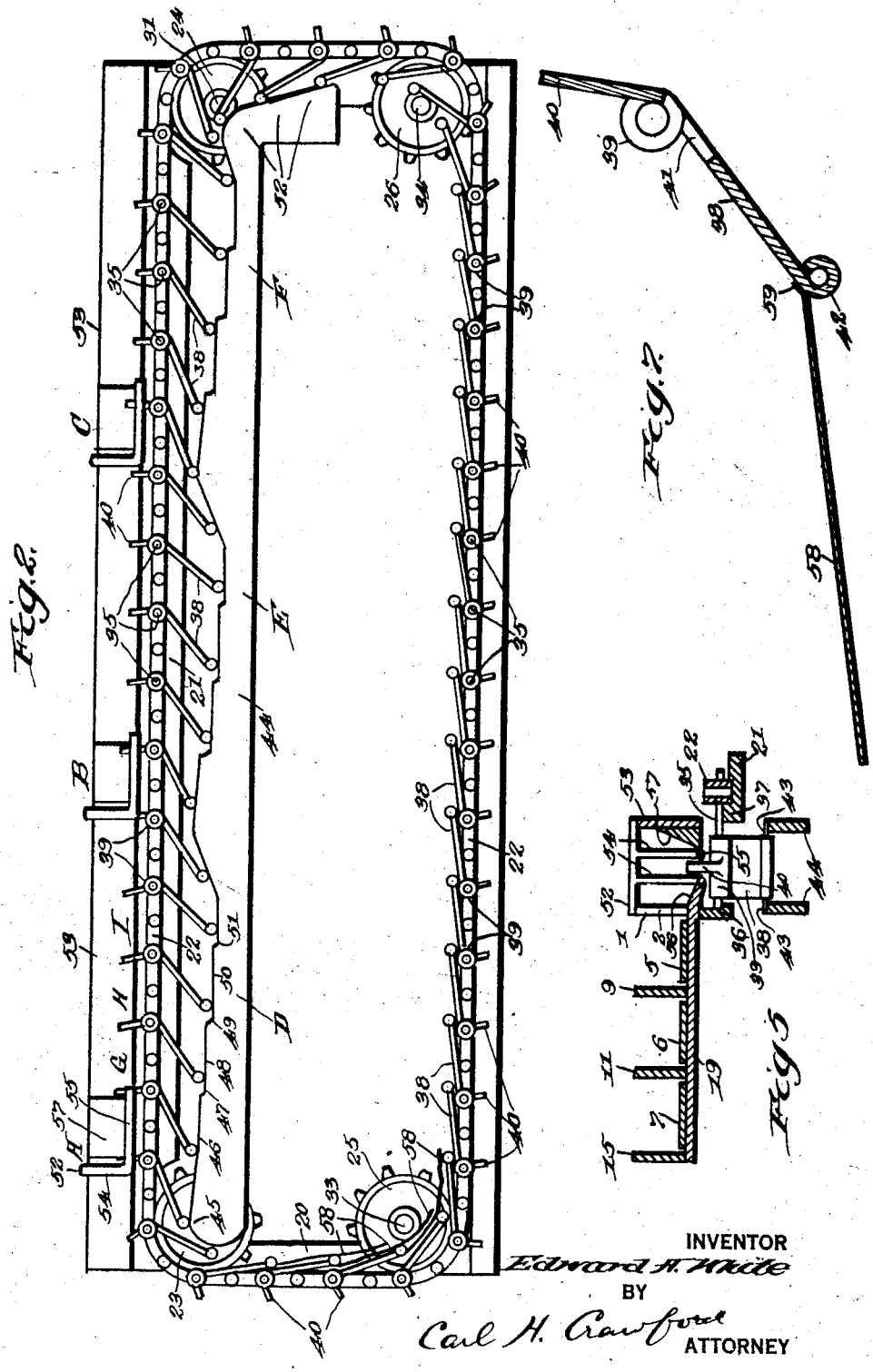

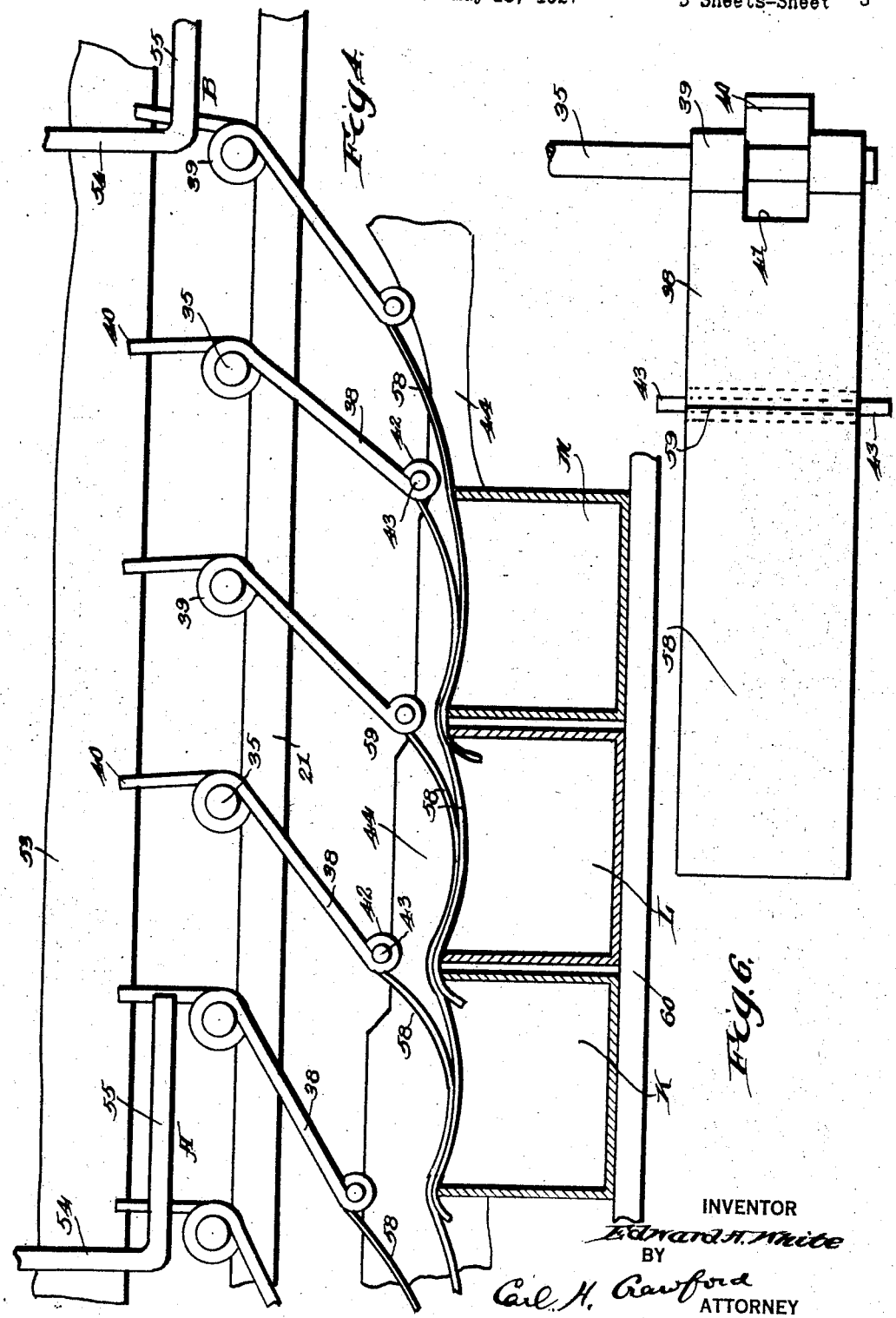

Patented Apr. 23, 1929.

1,710,199

UNITED STATES PATENT OFFICE.

EDWARD A. WHITE, OF LEWISTON, IDAHO.

SIZING MACHINE.

Application filed May 18, 1927. Serial No. 192,332.

This invention relates to improvements in sizing mechanism for fruit and like entities.

One of the novel features comprises a holder for an entity, the holder being adapted to receive the entity laterally thereof and discharge or release the entity lengthwise thereof.

Mechanism is provided for delivering fruit entities to the holder, one at a time, and sizing mechanism co-acts with the holder to eject the entities therefrom, said mechanisms mutually co-acting in a novel manner to insure delivery of the entities to said holder, one by one.

A further novel feature resides in sizing mechanism having sizing elements in the form of plates, said plates being so manipulated as to cause the upper ends thereof to form receiving throats for the entities to be sized, the lower ends being movable in varying degrees of parallel, converging and diverging relation in the performance of the sizing and releasing function.

A further feature of the invention resides in novel means for advancing the sizing plates throughout an endless path of travel, the plates being proportioned and mounted in such a novel manner that during their progress through inactive laps of travel, they will overlap and be maintained in compact relation.

A further novel feature consists in providing an entity holder of skeleton formation and equipping the sizing plates, each with an ejector adapted to pass through the holder in functioning to shift the entity onto the sizing mechanism.

A further novel feature consists in co-acting sizing plates wherein the ejector of one plate will eject an entity onto the next foremost plate, with respect to the direction of travel, the entity thus being supported partly on such foremost plate and the next rearward plate prior to the releasing action.

A further feature of the invention resides in novel means for cushioning delivery of the entities from said plates into the boxes or receivers with a view of avoiding injury to the entities. In this connection, this feature of the invention involves flexible delivery aprons attached to the plates in such a manner as to trail the latter.

A further feature of the invention resides in novel belt means for delivery of fruit entities of different grades to a series of fruit holders, the device involving a primary belt functioning to deliver one grade of entity to one holder, means being provided for shunting the different grades from the auxiliary belts onto the primary belts and finally shifting the entities from the primary belt onto the proper holder.

The invention has many other objects and features which will be more fully described in connection with the accompanying drawings and will be more particularly pointed out in and by the appended claims.

In the drawings:—

Figure 1 is a plan view showing the most improved form of my invention.

Figure 2 is a sectional view on line 2—2 of Fig. 1 looking in the direction of the arrow.

Figure 3 is a sectional view on line 3—3 of Fig. 1 looking in the direction of the arrow.

Figure 4 is an enlarged view of a portion of the device shown in Fig. 2 and illustrating the aprons and the manner in which they co-act with the fruit boxes or receivers.

Figure 5 is a sectional view on line 5—5 of Fig. 1.

Figure 6 is a plan view of one of the sizing plates and the apron attached thereto.

Figure 7 is an edge view thereof.

Like characters of reference designate similar parts throughout the different figures of the drawings.

Before describing the sizing mechanism in detail, I will first describe the means and manner whereby the entities are delivered to said mechanism and in order to make general reference to said mechanism perfectly clear, I will first briefly refer to the entity holders and designate them by general reference.

The holders shown will be generally designated as A, B and C and it will be noted that they are in spaced relation and linearly disposed. A side wall 1 has openings 2, 3 and 4 for passage therethrough of the entities to said holders. I employ what I will term a primary belt 5 and auxiliary belts 6 and 7 which, as will be seen by reference to Figure 1, are disposed in parallel relation, all the belts running in the same direction, as indicated by the arrows. These belts lead from any suitable source of supply from the left of Fig. 1, all the apples or other entities of all sizes in one grade, being deposited on the primary belt 5. The entities of all sizes of another grade will be advanced by belt 6; belt 7 caring for all sizes of still another grade of entities. Thus the apparatus shown involves three grades although more or less may be provided for, as will be perfectly clear as a result of this disclosure.

I provide a deflector 8, extending from a dividing wall 9, across belt 5 to deflect or shunt all the entities initially deposited on belt 5 toward holder A, through entrance 2. A deflector 10 extends in parallel relation with deflector 8, across belt 6 from dividing wall 11, to dividing wall 12, to shunt the entities initially deposited on belt 6, over to primary belt 5. A deflector 13 extends from dividing wall 12 to wall 1, for shunting the entities through entrance 3 to holder B. A deflector 14 extends across belt 7, from wall 15, to wall 16 for shunting entities from belt 7 to belt 6. A deflector 15′, extends across belt 6 from wall 16 to wall 17 for shunting entities from belt 6 to belt 5. A deflector 18 extends across belt 5, from wall 17 to wall 1 for shunting entities through entrance 4 to holder C.

I have shown a bottom wall 19 serving for all the upper laps of belts 5, 6 and 7 and the dividing walls 9, 11 and 15.

It will thus be seen that the primary belt 5 functions as a delivery agent for all three holders, A, B and C and for all sizes of all grades of entities, the grades being isolated from each other as shown and described by the disposition of transfer devices. I will subsequently describe the manner in which this belt delivery mechanism and the sizing mechanism co-act in causing or limiting delivery of entities to the holders, one at a time, irrespective of the relative juxtaposition of the entities on the belts. It may also be stated that the delivery belts will be operated approximately at the same speed at which the sizing mechanism is advanced.

Reference will next be made to the sizing mechanism and the means for operating the same.

A frame is generally designated at 20 and I have shown the same provided with a support 21. The actuating means for the sizing mechanism is herein shown in the form of an endless belt which may be a sprocket chain 22. The upper lap of said chain bears upon support 21 and said chain is trained about wheels 23, 24, 25 and 26 which serve to guide the chain through upper and lower horizontal laps of travel and downward and upward vertical laps of travel, as will be clearly seen by reference to Fig. 3. Wheel 23 is mounted upon a shaft 27 which may be journaled in suitable bearings 28, one only being herein shown. Shaft 27 may be a drive shaft to which power may be applied in any suitable manner such as a belt 29 and pulley 30. Shaft 31, on which wheel 24 is mounted, may be journaled in bearings 32, one only of which is shown. Shaft 33, on which wheel 25 is mounted, and shaft 34 on which wheel 26 is mounted, may be journaled in suitable bearings which it is not necessary to show, it being merely sufficient to state that all of said shafts are journaled to rotate about fixed axes. Extending laterally from said chain 22 is a series of sizing plate supporting rods 35 which are equi-distantly spaced apart in parallel relation. I may provide a track 36, as shown in Figure 5, on which the inner ends of said rods 35 may ride throughout the upper horizontal lap of travel. It may also be desirable to provide support 21 with a rod support track 37, as will also be clear from Fig. 5. In practice, the chain 22 will have rods extending laterally in opposite directions therefrom so that one chain may actuate a sizing mechanism on each side thereof which would thereby balance the stresses to which the chain and rods would be subjected. However, it is sufficient for the purposes of presenting this invention to only show one sizing apparatus as mere duplication thereof to any extent would be obvious.

I will next describe the improved sizing mechanism.

Said sizing mechanism involves a series of sizing plates all of which are identical in structure and function and only one of which need be described in detail. Each plate comprises a plate body or sizing portion 38 which may be formed of any suitable sheet material. The upper end of the plate is rolled at 39 to form a sleeve which is adapted to be slipped or telescoped endwise onto a rod 35 and which is rotatably free on rod 35 to move by gravity about said rod as an axis. The upper end of each plate, which is the pivoted end, is provided with an upstanding ejector 40. As a convenient means of forming said ejector 40 I may cut the same from the stock of the plate 38, as shown at 41, and bend it upwardly into the angular relation shown, with respect to plate 38. Because of the function to be performed by the ejector, the latter is located at such an angle to the extreme dispositions to which the plate may be moved, that the ejector 40 will always be in a substantially vertical position on the upper lap of travel. The lower end of plate 38 is bent into a roll 42 and I insert therethrough an actuating rod 43 that projects on opposite sides of said plate 38, as clearly shown in Figs. 5 and 6.

As a means of actuating the sizing plates to perform their sizing function, I have provided cam tracks 44, both of which are identical in function and structure and only one of which need be described in detail. It may also be stated that the cams or cam tracks are arranged to divide each grade into three sizes, although a greater or less number may be provided if necessary. Therefore in Fig. 2 I will designate three sections of cam 44 by reference letters D, E and F, section D actuating the plates for entities from holder A, of one grade; section E actuating the plates for three sizes of entities from holder B; and section F actuating the plates for three sizes of entities from holder C. From a high beginning point 45, section D declines as shown at 46 to the first drop 47. A length 48 holds the plates in a sustained position until drop 49 is reached, and likewise, a sustained portion 50 holds the plates in a given position until drop 51 is reached. Thus it will be seen that while the first two plates 38 to the right of holder A are in converging relation, the next two plates are in parallel relation, and the next two plates are in diverging relation. Hence, only the smallest size entity dropping into throat G would be allowed to descend between the plates and if it were a medium or large size entity, it would not descend but would be carried to throat H or I, dependent on size of the entity before it was released. It will be seen that the sizing function is performed by varying the relation of the sizing plates with respect to each other either into converging, parallel or diverging order. It will also be noted that the plates 38, while in the process of performing their sizing function, are in under lapping relation with respect to each other, to various degrees, and they are so proportioned in length with respect to the centers about which they are pivoted, as to insure overlapping contact when in close relation. The different elevations in sections E and F need not be described in detail but I will refer to a portion 52 of cam 44 which serves as a guide to insure an underlapping relation of the plates as they descend the vertical lap of travel, as will be clear by reference to Fig. 2. On the lower lap of travel the plates 38 take the overlapping position shown by gravity, thereby insuring a compact relation during this non-functioning portion of travel. On the upward lap of travel, to the left of Fig. 2, the plates overhang each other by gravity and come into an effective position to be elevated by the high point 45, of cam 44, as they round into the upper horizontal lap.

I will next describe the improved holder for the entities and as all of the holders are identical in structure and function only one need be described in detail.

In the present form I have shown a holder of skeleton formation the same comprising a mount bar 52 which may have its opposite ends securely anchored to wall 1 and an opposite wall 53. Depending from said bar 52 is a pair of limbs 54 which are bent to horizontally extend as at 55, to form a holder, the said portions 55 and 54 being in spaced relation and said horizontal portions 55 being of a length slightly in excess of the length of entrance 2. Furthermore, as will be seen by reference to Fig. 5, said holding portions 55 are at a slightly lower elevation than wall 19 so that the entities passing through entrance 2 will descend by gravity to reach the holding portions 55. I may provide a run way 56 on which the entities can descend onto the holder, and on the opposite side, I provide block 57 to prevent the entities from going too far to the right of Fig. 5, this block 57 acting as an abutment. It will thus be seen that the holder has open back and bottom portions and that the entity held by the holder, is free to be ejected endwise off from the latter, to the right of Fig. 1.

Reverting again to the ejectors 40, it will be seen that they pass through the skeleton holder and eject the entity thereon, forwardly onto the next preceding sizing plate. Furthermore, while an entity is located on the holder, and before it is ejected, another entity cannot be fed in through entrance 2 because the apple or other entity would block advancing movement of its successor. Furthermore, the ejector that is actively functioning to eject an entity from the holder would be in close relation and contact with such entity, hence, the next following entity would be bound to enter the holder behind the acting ejector. This insures delivery of the entities to the holder in a one by one order. The fact that the primary belt 5 travels at approximately the same speed as chain 22, together with the foregoing co-action, explains the interdependently functioning of the delivery and sizing mechanisms.

The release of fruit or like entities, from the sizing plates into subjacent containers, especially apples, or any soft fruits, would very probably subject the latter to bruising, which, however slight, might reduce the keeping qualities of the fruit. I have therefore devised ways and means for cushioning the descent of fruit released from the sizing plates, which I will next describe in detail.

Referring to Figs. 4 and 6, it will be seen that I have provided each sizing plate with a flexible apron 58, which is secured to the sizing plates at 59, in such a manner as to trail the free lower ends of said plates. These aprons will advantageously be made of thin, light weight material, probably canvas, and, as shown in said figures, the length of the apron will be somewhat greater than the length of the sizing plate to which it is attached, although this is not a limitation of a final and confining nature. However, this length of apron shown, affords an overlapping relation of the aprons such as will effectively cushion the final disposition of the released entities into the boxes in which they are received. In Fig. 4, I have shown three boxes which I have lettered K, L and M, mounted upon a suitable support 60, in such subjacent relation to the sizing plates between holders A and B, that the trailing aprons will drag over the tops of said boxes in overlapping relation with respect to each other. The weight of an entity, will "sag" the aprons before the entity is released therefrom, and when the aprons have advanced far enough to release the entity, it will have only a slight distance to descend until it engages a portion of the contents of the box. Thus, the danger of bruising an entity is reduced to a minimum.

I have stated that the flexible aprons 58 were secured at their forward ends to the sizing plates 59 in such a manner as to trail the free lower ends of said plates, and as the aprons are not otherwise secured or attached to anything, it will be seen that these aprons are full floating aprons.

While it is true that the aprons constitute a delivery means the function of which is performed subsequent to the function of sizing the entities, still, the two operations are practically continuous and are performed by a structure which is unitary, consequently while the functions performed are not overlapping, they are at least sequential and interdependently supplementive.

It is believed that the operation will be understood from the foregoing description but it may be briefly recapitulated as follows.

All sizes of the different grades of fruit will be selectively delivered to the respective entrances of the holders by the belt arrangement 5, 6 and 7, as heretofore described. As each entity is received in its holder, above the sizing plates, the ejectors 40 of the latter will eject the entities off from the holders and the descent down onto the sizing plates is of such an extremely limited extent that no possible injury could result therefrom.

At this point it is desired to point out the very great advantage of feeding the entities into the holders laterally and ejecting the entities from the holders by a sizing means movable in subjacent relation to the holders so that the juxtaposition of the two can thus be arranged, as shown, with the great advantage of affording a limited fall of the entities.

By reason of the fact that when an entity is received by the plates, it is supported thereby against descent, initially, there is no possible way in which such entity can be squeezed between the plates before being released therefrom as whatever object is being sized, is first supported in the throat of the two plates. As the plates advance, they are gradually adjusted from converging to parallel and finally into diverging relation for release of the entities in accordance with the size thereof, each size entity being released at a predetermined point. By reason of the fact that the sizing plates only coact with each other through the medium of the entity interposed therebetween, it will be seen that in a strict physical and mechanical sense, they are always out of actual contact when functioning as sizing plates. Hence, I not only avoid the friction of such physical coaction, but I also avoid the cost of making the sizing elements sufficiently accurate to afford smooth operation, which is a feature of great importance in a light duty machine.

In order not to obscure the structure, I have shown only a few of the aprons in Fig. 2, the location and operation of the aprons being disclosed more clearly in the enlarged view made for that purpose, although it will be understood that the apron delivery feature is a part of the machine, in actual practice.

By reason of the fact that the delivery aprons are at all times in trailing relation to the sizing plates, all danger of entanglement is reduced to a minimum, and the length of the aprons can be so regulated with respect to the boxes and the sizing plates, that deposition of the proper size fruit in the proper box, after leaving the sizing plates, will be at all times assured.

It is believed that the invention will be fully understood from the foregoing description, and while I have herein shown and described one specific form of my invention, I do not wish to be limited thereto except for such limitation as the claims may import.

I claim:

1. In a sizing machine for fruit or like entities, a skeleton entity holder, and pivoted sizing plates in trailing underlapping relation travelling under said holder, each plate having an upstanding ejector passing through said skeleton holder for ejecting an entity from said holder onto the next forwardly disposed sizing plate.

2. In a sizing machine for fruit or like entities, an entity holder, travelling means for delivering single entities laterally onto said holder, and sizing mechanism travelling substantially parallel to said means and abreast of said holder and having means for singly ejecting entities from said holder onto said mechanism.

3. In a fruit or like entity sizing machine, a series of sizing elements for sizing the entities, and each of said elements having a full floating flexible entity supporting and delivery member.

4. In a fruit or like entity sizing machine, a series of sizing plates for sizing the entities, and each plate having a full floating flexible entity supporting and delivery cushioning apron.

5. In a fruit or like entity sizing machine, a series of sizing plates pivotally supported at their upper ends and the lower ends being free to take various positions by gravity, means for actuating the lower ends to perform the sizing function, and each plate having connected with its lower end a flexible delivery apron for cushioning delivery of the entities released from said plates.

6. In a fruit or like entity sizing machine, a series of sizing plates for sizing the entities, and each plate having a cushioning delivery apron trailing therefrom and adapted to drag over the top of a receiver and descend therein when delivering an entity thereto.

7. In a fruit or like entity sizing machine, a series of sizing plates adapted to be advanced along a path of travel, and each plate having a trailing delivery apron connected therewith, and said trailing aprons being of sufficient length to overlap and coact in delivering the sized entities released from said plates.

8. In a fruit or like entity sizing machine, a skeleton holder adapted to receive an entity laterally thereof and release such entity lengthwise thereof, sizing elements travelling below said holder and having ejectors passing through and ejecting entities lengthwise from said holder, and means for delivering entities laterally onto said holder, said ejectors preventing delivery to said holder while passing through the latter.

9. In a fruit or like entity sizing machine, a holder for the entity, travelling mechanism for delivering entities laterally onto said holder, and travelling sizing mechanism for ejecting entities from said holder, said mechanisms coacting to limit delivery of more than one entity at a time to said holder.

10. A fruit or like entity sizing machine, comprising, a series of linearly disposed entity holders each adapted to receive distinct grades of entities from one side thereof, sizing means for removing said entities from said holders, and mechanism for delivering distinct grades of entities laterally onto predetermined holders.

11. A fruit or like entity sizing machine, comprising, a series of linearly disposed entity holders each adapted to receive a distinct grade of entity, sizing means for removing said entities from said holders, and mechanism for delivering distinct grades of entities to predetermined holders.

In witness whereof, I hereby affix my signature.

EDWARD A. WHITE.